United States Patent [19]
Myers

[11] 3,793,745
[45] Feb. 26, 1974

[54] AGGREGATE DRYER

[76] Inventor: Donald W. Myers, 11000 S.W. Boones Ferry Rd., Portland, Oreg. 97219

[22] Filed: Mar. 19, 1973

[21] Appl. No.: 342,507

[52] U.S. Cl.................... 34/189, 34/171, 34/203, 34/236
[51] Int. Cl............................................. F26b 15/20
[58] Field of Search................ 34/25, 171, 174–178, 34/201–208, 211, 216, 217, 236, 189, 190; 198/82

[56] References Cited
UNITED STATES PATENTS

| 999,706 | 8/1911 | Eichler et al. | 34/203 |
| 3,419,876 | 4/1947 | Birdseye | 34/203 |
| 2,452,983 | 11/1948 | Birdseye | 34/203 |
| 3,432,940 | 3/1969 | Ronceray et al. | 34/189 |

*Primary Examiner*—Kenneth W. Sprague
*Assistant Examiner*—James C. Yeung
*Attorney, Agent, or Firm*—Oliver D. Olson

[57] ABSTRACT

A plurality of elongated conveyors are arranged in two vertical stacks disposed side-by-side the conveyors of the first stack being spaced apart vertically and inclined upward in one direction and the conveyors of the second stack being spaced apart vertically and inclined upward in the opposite direction. The upper, outfeed end of each conveyor is positioned vertically above, but to the side of, the lower, infeed end of the next adjacent conveyor, in the downstream direction of movement of aggregate through the conveyors, and a side chute communicates the upper, outfeed end of each conveyor with the lower, infeed end of the next adjacent downstream conveyor. A source of heat is associated with the conveyors, and the assembly is confined in a housing provided with an aggregate inlet communicating with the lower, infeed end of the lowermost conveyor, an aggregate outlet communicating with the upper, outfeed end of the uppermost conveyor, and a vapor outlet at the upper end of the housing. Aggregate material thus is conveyed upward alternately through the conveyor stacks while being heated sufficiently to vaporize its moisture content.

10 Claims, 3 Drawing Figures

AGGREGATE DRYER

BACKGROUND OF THE INVENTION

This invention relates to the drying of aggregate material, and more particularly to conveyor type dryer apparatus by which to dry aggregate material with speed and efficiency and without the production of ecological pollutants.

Various forms of aggregate dryers have been provided heretofore, being either of the rotary type or of the conveyor type. The rotary type dryer operates at high temperature and high air velocity, both of which contribute to the production of large amounts of fines which escape to the atmosphere as dust, creating a pollution hazard. Dryers of the conveyor type heretofore have been characterized by being of complex construction, involving costly installation and maintenance, and being of extremely large size, requiring excessive installation space. In addition, such conveyor types heretofore have utilized the source of heat quite inefficiently, thereby contributing further to excessive cost of operation.

Rock aggregate for asphalt manufacture conventionally is screened to sizes before drying. However, because of the cost and size of both rotary and conveyor types, it has been the practice heretofore to re-mix the sizes as they are run through a single dryer. This procedure involves the added time and cost of re-screening the dry aggregate.

SUMMARY OF THE INVENTION

In its basic concept, the aggregate dryer of this invention involves the arrangement of a plurality of an elongated conveyer in two adjacent, oppositely inclined stacks with the upper, outfeed end of each conveyor disposed above, but to the side of, the lower, infeed end of the next adjacent downstream conveyor and communicating therewith through a side conveyor, whereby aggregate material is conveyed upwardly from the lowermost conveyor to the uppermost conveyor in a substantially rectangular pattern, as viewed in plan.

It is by virtue of the foregoing basic concept that the principal objective of this invention is achieved; namely, to overcome the aforementioned disadvantages of prior aggregate dryers.

Another important object of this invention is the provision of an aggregate dryer unit of small size and minimum cost, thereby allowing a plurality of such units to be utilized each for a different size of previously screen aggregate material, thereby eliminating the former requirement of re-screening and assuring the storage and ultimate use of completely dry and heated aggregate.

A further important object of this invention is the provision of an aggregate dryer construction which functions to elevate aggregate material automatically during drying for convenient gravity discharge into containers for sealed storage.

Still another important object of the invention is the provision of an aggregate dryer which functions efficiently to discharge water vapor in substantially pure form, either for expulsion to the atmosphere or for recovery and subsequent use.

The foregoing and other objects and advantages of this invention will appear from the following detailed description, taken in connection with the accompanying drawings of a preferred embodiment.

DESCRIPTION OF THE PREFERRED EMBODIMENT

As previously mentioned, the aggregate dryer of this invention is of the conveyor type. It includes a plurality of elongated conveyors arranged in two vertical stacks disposed side-by-side. The number of conveyors of each stack may be varied, as desired, and they are spaced apart vertically. The conveyors of one stack are inclined upward in one direction for moving aggregate material upwardly from the lower, infeed end to the upper, outfeed end of each conveyor. The conveyors of the second stack also are spaced apart vertically and are inclined upward in the direction opposite the inclination of the conveyors of the first mentioned stack, for moving aggregate material upwardly from the lower, infeed end to the upper, outfeed end of each conveyor.

The upper, outfeed end of each conveyor is positioned vertically above, but to the side of the lower, infeed end of the next adjacent conveyor, in the downstream direction of movement of aggregate through the conveyors. A side conveyor communicates the upper, outfeed end of each elongated conveyor with the lower, infeed end of the next adjacent downstream conveyor.

Figure 1:
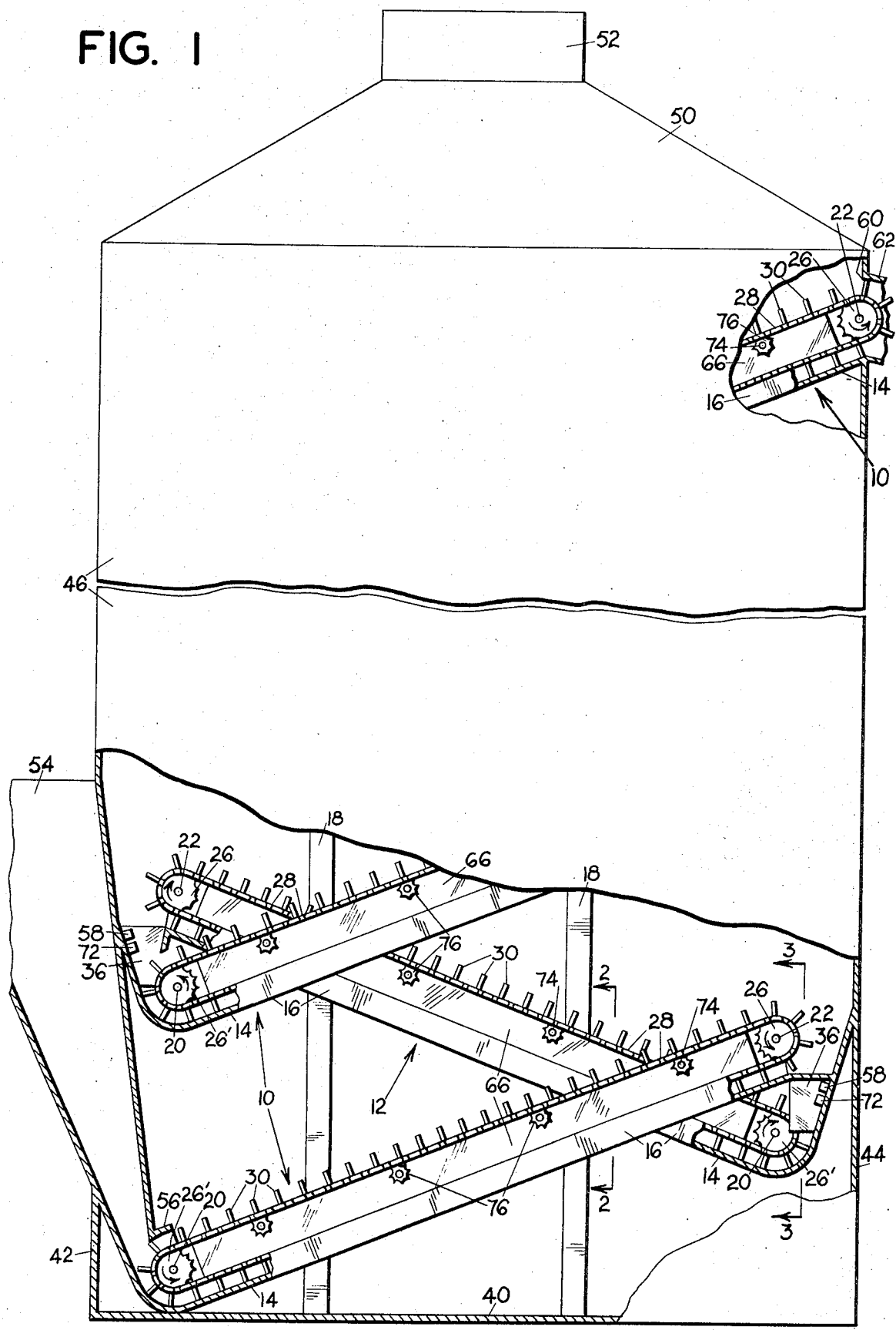
FIG. 1 is a fragmentary, foreshortened view in side elevation of an aggregate dryer embodying the features of this invention, portions being broken away to disclose details of internal construction.

Thus, referring to the drawings, and particularly in FIG. 1, a plurality of elongated conveyors 10 are spaced apart vertically to form a first stack, with each conveyor inclining upward toward the right. In similar manner, a plurality of elongated conveyors 12 are spaced apart vertically to form a second stack, and each conveyor is inclined upward toward the left. The movement of each conveyor is in a direction to move aggregate material upward from the lower, infeed end to the upper, outfeed end.

Figure 2:
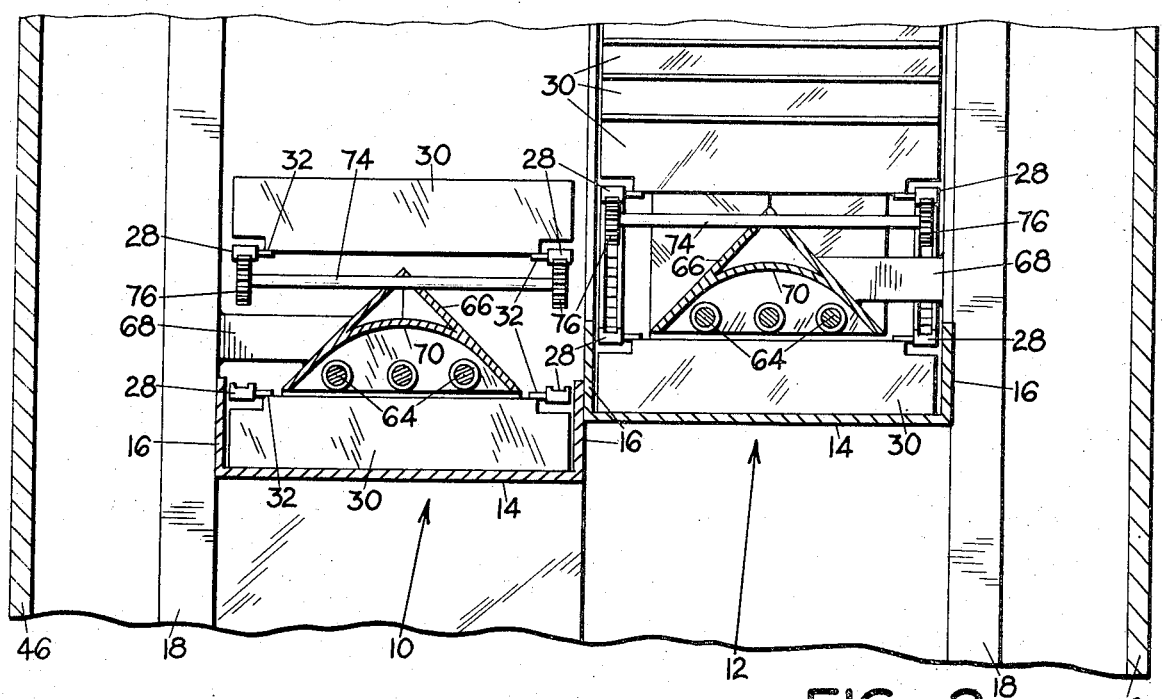
FIG. 2 is a fragmentary sectional view taken on the line 2—2 in FIG. 1.

In the embodiment illustrated, each conveyor includes an elongated trough (FIG. 2) having a bottom 14 and laterally spaced, upwardly extending side walls 16. The troughs of adjacent conveyors of the two stacks abut each other along adjacent side walls and are there secured together for common support, as by means of bolts, welding, or other suitable means. The outboard side walls of the troughs are secured to upstanding beams 18.

Adjacent the opposite ends of each trough are transversely extending shafts 20 and 22 supported at their opposite ends in bearings 24 (FIG. 3) mounted upon and extending upward from the side walls 16 of the trough. Each shaft supports a pair of laterally spaced sprockets 26 over which are trained a pair of laterally spaced, endless chains each of which is composed of a plurality of pivotally interconnected links 28, in manner analogous to a bicycle chain.

The pair of laterally spaced endless chains support between them a plurality of spaced blades, commonly referred to as flights 30, Each flight is secured adjacent its opposite ends rigidly to a link 28 of each chain and projects outwardly therefrom. In the embodiment illustrated, these rigid connections are made by welding or otherwise securing the flight to lugs 32 secured to and projecting inwardly from the chain links.

The arrangement of chains and flights is such that the flights projecting downward from the lower stretch of the chains are disposed within the trough and elevated slightly above the trough bottom 14. This eliminates the flights as a source of wear on the troughs.

The shaft 22 at the upper end of each trough is driven rotationally by any suitable means. In the embodiment illustrated, such means comprises an electric motor 34 (FIG. 3) supported upon a bracket projecting outward from one of the bearings 24. The shaft 20 at the lower end of each trough need not be driven, as will be understood.

The foregoing arrangement of conveyors functions to move aggregate material upward from the lower, infeed end to the upper, outfeed end where means is provided for conveying the aggregate material laterally to the lower, infeed end of the next adjacent downstream conveyor, i.e. downstream in the direction of movement of the aggregate material through the conveyor assembly. In the embodiment illustrated, such side conveyor means comprises an inclined chute 36. The upper end of the chute communicates with the upper, outfeed end of the upstream trough, and the lower end of the trough communicates with the lower, infeed end of the next adjacent downstream trough. Aggregate material expelled from the upper, outfeed end of the upstream trough thus gravitates laterally downward to the lower, infeed end of the next adjacent downstream trough.

Figure 3:
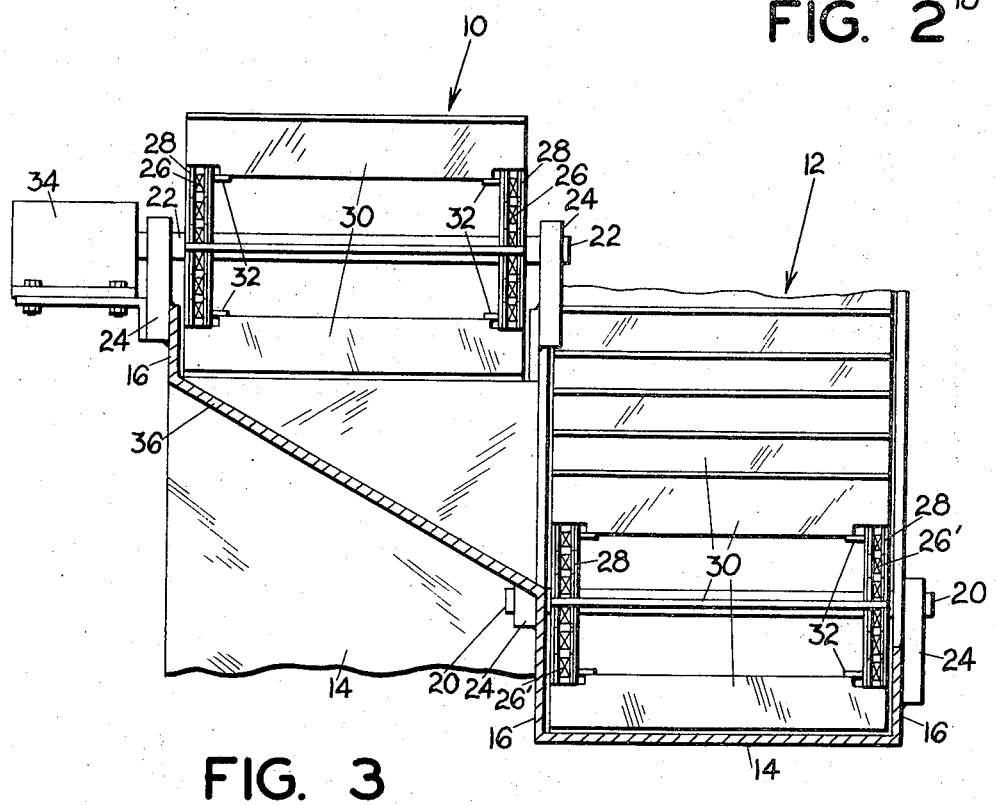
FIG. 3 is a fragmentary sectional view taken on the line 3—3 in FIG. 1.

It is to be noted, with reference to FIGS. 1 and 3, that the side chutes 36 at the right hand side of FIG. 1 incline downwardly toward the right (FIG. 3) to communicate the upper, outfeed ends of the troughs of the conveyors forming the first stack 10 with the lower, infeed ends of the troughs of the conveyors forming the second stack 12. The side chutes 36 at the left hand side in FIG. 1 incline downward toward the left, to communicate the upper, outfeed ends of the troughs of the conveyors of the second stack 12 with the lower, infeed ends of the troughs of the conveyors of the first stack 10. Accordingly, when viewed from the top in FIG. 1, the movement of aggregate material through the conveyor assembly follows a substantially rectangular pattern as it progresses upward through one conveyor of the first stack 10, thence laterally downward through a side chute 36 and upward through the adjacent downstream conveyor of the second stack 12, thence laterally downward through a side chute 36 and upward through the next upper conveyor of the first stack 10, and so on.

The foregoing assembly of conveyors is confined within a housing which includes a bottom wall 40, end walls 42 and 44, side walls 46 and 48 and a tapered top 50 provided with a vapor discharge outlet 52. The end wall 42 is provided adjacent its bottom side with an aggregate infeed hopper 54 which communicates at its lower end with the lower, infeed end of the lowermost conveyor trough. In the embodiment illustrated, the infeed hopper tapers downward to constricted dimension to provide choke feed of aggregate to the lowermost conveyor. This contributes beneficially to the substantial elimination of the introduction of outside air to the housing. An inwardly directed flange 56 at the lower end of the infeed hopper serves to span the space between adjacent flights and thus prevent the entrance of aggregate material through the area of the upper stretch of the conveyor.

Further, the sprocket 26' at the infeed end of each conveyor is provided as a drum sprocket which encloses the shaft 20 and spans the space between the chains to prevent aggregate from entering the trough except by movement of the flights. This affords choke feeding of the aggregate at the infeed hopper and at each side chute, whereby to prevent the cascading of aggregate and the consequent elimination of dust. Maintenance of choke feeding, particularly in the upper side chutes where the aggregate is quite dry, is provided by the use of level sensing devices 58, known in the art as Bindicators. Such devices operate to control the speed of the next downstream conveyor to insure maintenance of a desired level of aggregate in the side chutes.

It is to be noted that the arrangement of flights supported by chains driven from sprockets affords positive metering of the flow of aggregate material.

The end wall of the housing also is provided with an outlet opening 60 adjacent its upper end for the discharge of dried aggregate material. The upper, outfeed end of the uppermost conveyor registers with this opening which, in practice, communicates with a discharge pipe 62 which delivers the dried aggregate material to a storage container (not shown). The storage container is capable of being sealed, to insure maintenance of the aggregate material in dry and heated condition preliminary to ultimate use.

A source of heat is provided within the housing for effecting drying of the aggregate material by causing the vaporization of the moisture content thereof. Various sources of heat may be utilized, as desired, including combustible fuels such as natural gas or oil. In the embodiment illustrated, the source of heat is provided by an electrical heater unit associated with each conveyor. Thus, referring primarily to FIG. 2, there is shown three laterally spaced, elongated electrical resistance heaters 64 mounted within an elongated guard 66 of inverted V-shape. The guard is supported, by such means as brackets 68, within the space between the upper and lower stretches of the conveyor chains 28 and extending parallel to the conveyor trough.

A reflector 70 within the guard serves to concentrate the radiant energy from the heaters within the confines of the trough, for most efficient transfer of heat to the moisture-laden aggregate material being conveyed through the trough by the conveyor flights 30. Further, the housing preferably is insulated to insure maximum retention of heat within it.

It will be understood, of course, that the number of heater elements associated with each conveyor may be varied from one to any desired number other than the three illustrated.

Temperature sensing devices 72 preferably are installed in all or at least the upper side chutes, to control the speed of all of the conveyors simultaneously, whereby to insure the outfeed of aggregate at optimum dryness and temperature.

In addition to providing support for the heater elements 64, the guard 66 functions to direct aggregate material, which may have been carried around to the upper return stretch and there dislodged to fall therefrom, back into the underlying trough.

In the embodiment illustrated, the guard 66 also functions to support a plurality of longitudinally spaced, transverse shafts 74 which support at their opposite ends idler sprockets 76 which serve to support the upper, return stretches of the conveyor chains 28 and the flights 30 attached thereto.

In the operation of the apparatus described hereinbefore, aggregate material to be dried is introduced through the inlet hopper 54 to the lower, infeed end of the trough of the lowermost conveyor of the first stack 10. As the conveyor chains 28 are moved by rotation of the sprockets in the directions illustrated by the arrows, the flights 30 withdraw aggregate material from the infeed hopper and move it upwrad toward the right in FIG. 1 to the upper, outfeed end of the trough. From here the aggregate material gravitates laterally downward through the side chute 36 and into the lower, infeed end of the trough of the next adjacent downstream conveyor of the second stack 12. The movement of the flights of said conveyor thus moves the aggregate material upward toward the left to the upper, outfeed end. The aggregate material then gravitates downward toward the left, with reference to FIG. 3, through the side chute 36 to the lower, infeed end of the trough of the next upper conveyor of the first stack 10.

The foregoing sequence of alternate movement of the aggregate material through the conveyors of each stack, continues upwrad until it is discharged from the upper, outfeed end of the uppermost conveyor. During this upward movement of the aggregate material, through the substantially rectangular pattern as viewed in plan in FIG. 1, it is tumbled mildly while being subjected to heat provided by the heaters 64 associated with each conveyor. This mild tumbling of the aggregate material insures complete removal of moisture from the latter in a minimum of time through movement of a minimum number of conveyors. The mild tumbling of the aggregate material is insufficient for the production of fines, thereby substantially eliminating the discharge of dust from the apparatus.

The apparatus described hereinbefore is suitable for the drying of a wide variety of types of aggregate material, such as mineral ores, cement, peat moss, nuts, and others. It is particularly suitable for the drying of rock aggregate utilized in the manufacture of asphaltic paving material. In this regard, such paving material generally includes rock aggregates of various sizes in various proportions. A typical mixture includes 50% quarter inch minus; 25% quarter inch to one-half inch; and 25% ½ inch to three-quarter inch.

Thus, the apparatus of this invention has particular advantage in the drying of rock aggregate after the latter has been screened to the prescribed sizes. For example, since the apparatus is of simplified and therefore relatively inexpensive construction and utilizes a minimum of ground space, any desired number of the dryer units may be utilized, one for each size of pre-screened aggregate. The dried aggregate from each unit then may be stored in a separate, sealed container, thereby assuring maintenance of the dry and heated condition of the aggregate pending formulation into desired proportions for the manufacture of asphalt paving material.

The heaters 64 function efficiently to remove the moisture content of the aggregate material. The moisture vapor discharges through the outlet 52 of the housing in substantially pure form. Accordingly, this water vapor may be discharged to the atmosphere as a non-polluting component. Alternatively, it may be recovered as a source of steam or substantially pure water for subsequent use.

From the foregoing it will be appreciated that the present invention provides an aggregate dryer of simplified construction for economical manufacture and use in multiples for drying pre-screened aggregate, It is versatile in its utility in drying a wide variety of types of aggregate material at high production rates and without the expulsion of ecological pollutants. The dryer does not utilize high velocity air, and therefore the total operation power requirement is minimized. Small electric drive motors for the conveyors further reduce operational power requirement, as compared with the drive power required for conventional rotary dryers.

It will be apparent to those skilled in the art that various changes may be made in the size, shape, type, number and arrangement of parts described hereinbefore without departing from the spirit of this invention.

Having now described my invention and the manner in which it may be used, I claim:

1. Apparatus for drying aggregate material, comprising
a. a plurality of elongated first conveyors spaced apart vertically and forming a first stack of conveyors, said first conveyors being inclined in one direction for moving aggregate material upwardly from the lower, infeed end to the upper, outfeed end,
b. a plurality of elongated second conveyors spaced apart vertically and forming a second stack of conveyors, said second conveyors being inclined in the direction opposite the inclination of the first conveyors for moving aggregate material upwardly from the lower, infeed end to the upper, outfeed end,
c. the first and second stacks of conveyors being disposed side-by-side with the upper, outfeed end of each conveyor located above the lower, infeed end of the next adjacent downstream conveyor,
d. side conveyor means communicating the upper, outfeed end of each conveyor with the lower, infeed end of the next adjacent downstream conveyor,
e. a housing enclosing the assembly of conveyors,
f. aggregate inlet means communicating through the housing with the lower, infeed end of the lowermost conveyor,
g. aggregate outlet means communicating through the housing with the upper, outfeed end of the uppermost conveyor,
h. a vapor discharge outlet at the upper end of the housing, and
i. heater means in the housing for heating aggregate as it is moved toward the aggregate outlet means.

2. The apparatus of claim 1 wherein each conveyor comprises an elongated trough, and driven endless belt means supported at its opposite ends and mounting a plurality of spaced conveyor flights projecting outward therefrom, the lower stretch of said belt means being arranged adjacent the trough for movement of the flights therethrough.

3. The apparatus of claim 2 wherein each belt means comprises a pair of laterally spaced chains formed of a plurality of pivotally interconnected links, the conveyor flights extending between the pair of chains and being connected to a link of each chain.

4. The apparatus of claim 2 wherein the heater means comprises an elongated heater mounted above and substantially parallel to each conveyor trough between the upper and lower stretches of the associated belt means.

5. The apparatus of claim 4 wherein the heater means includes an elongated heater guard of inverted V-shape overlying the heater for directing aggregate falling from the upper stretch of the belt means into the trough.

6. The apparatus of claim 1 wherein each side conveyor means comprises a chute.

7. The apparatus of claim 1 including means associated with at least the side conveyor means in the upper portion of the housing for maintaining choke feeding of aggregate material.

8. The apparatus of claim 1 including level sensing means in at least the side conveyor means in the upper portion of the housing operable to control the speed of the next adjacent downstream conveyor for maintaining choke feeding of aggregate material.

9. The apparatus of claim 2 including temperature sensing means in at least the side conveyor means in the upper portion of the housing operable to control the speed of all of said elongated conveyors simultaneously for maintaining the outfeed of aggregate material at predetermined dryness and temperature.

10. The apparatus of claim 1 wherein a. each conveyor comprises an elongated trough, and driven endless belt means supported at its opposite ends and mounting a plurality of spaced conveyor flights projecting outward therefrom, the lower stretch of said belt means being arranged adjacent the trough from movement of the flights therethrough, b. each side conveyor means comprises a chute, c. the heater means comprises electric heater means mounted above each conveyor trough between the upper and lower stretches of the associated belt means, and an elongated heater guard of inverted V-shape overlying the heater means and extending sutstantially parallel to the trough for directing aggregate falling from the upper stretch of the belt means into the trough, and d. means is associated with at least the side chutes in the upper portion of the housing for maintaining choke feeding of aggregate material.

* * * * *

UNITED STATES PATENT OFFICE
CERTIFICATE OF CORRECTION

Patent No. 3,793,745     Dated February 26, 1974

Inventor(s) Donald W. Myers

It is certified that error appears in the above-identified patent and that said Letters Patent are hereby corrected as shown below:

Column 5, line 12, "upwrad" should read --upward--;
Column 5, line 26, "upwrad" should read --upward--;
Column 7, line 17, "2" should read --1--;

Column 8, line 15 "sutstantially" should read --substantially--.

Signed and sealed this 6th day of August 1974.

(SEAL)
Attest:

McCOY M. GIBSON, JR.          C. MARSHALL DANN
Attesting Officer             Commissioner of Patents